United States Patent
Fernandez et al.

(10) Patent No.: US 9,646,477 B2
(45) Date of Patent: May 9, 2017

(54) BRANCH DEVICE GEO-FENCING PAIRING SECURITY

(71) Applicant: NCR Corporation, Duluth, GA (US)

(72) Inventors: Rafael Torcida Fernandez, Madrid (ES); Stuart Birse, Dundee (GB)

(73) Assignee: NCR Corporation, Duluth, GA (US)

( * ) Notice: Subject to any disclaimer, the term of this patent is extended or adjusted under 35 U.S.C. 154(b) by 264 days.

(21) Appl. No.: 14/484,737

(22) Filed: Sep. 12, 2014

(65) Prior Publication Data
US 2016/0078742 A1 Mar. 17, 2016

(51) Int. Cl.
| | | |
|---|---|---|
| G08B 21/00 | (2006.01) | |
| G08B 21/18 | (2006.01) | |
| H04W 4/02 | (2009.01) | |
| G08B 13/14 | (2006.01) | |
| G08B 21/02 | (2006.01) | |

(52) U.S. Cl.
CPC ......... *G08B 21/18* (2013.01); *G08B 13/1427* (2013.01); *G08B 21/0261* (2013.01); *H04W 4/021* (2013.01); *G08B 21/0269* (2013.01); *G08B 21/0277* (2013.01)

(58) Field of Classification Search
None
See application file for complete search history.

(56) References Cited

U.S. PATENT DOCUMENTS

| | | | | |
|---|---|---|---|---|
| 8,659,414 B1* | 2/2014 | Schuk | ............... | G08B 21/0202 307/10.1 |
| 2007/0224980 A1* | 9/2007 | Wakefield | .......... | G08B 13/1427 455/418 |
| 2008/0143516 A1* | 6/2008 | Mock | .................... | G01S 5/0294 340/539.14 |
| 2010/0066545 A1* | 3/2010 | Ghazarian | .......... | G08B 21/0258 340/573.4 |
| 2010/0184378 A1* | 7/2010 | Wakefield | .......... | G08B 13/1427 455/41.2 |
| 2011/0280235 A1* | 11/2011 | Tiwari | ..................... | H04K 3/43 370/338 |
| 2013/0109375 A1* | 5/2013 | Zeiler | ................... | H04W 4/028 455/426.1 |
| 2013/0271281 A1* | 10/2013 | Jessop | ................ | G08B 21/0269 340/539.13 |

(Continued)

*Primary Examiner* — Julie Lieu
(74) *Attorney, Agent, or Firm* — Schwegman, Lundberg & Woessner

(57) ABSTRACT

Providing security for a sensitive item is implemented using geo-fencing. A geo-fence may be established as a dynamic virtual perimeter defining the maximum allowable distance between a sensitive item for which security is provided, and a security providing entity. The sensitive item has a first trackable device associated with it and the security providing entity has a second trackable device associated with it. The first trackable device and the second trackable device are paired to each other and tracked. The dynamic virtual perimeter may encompass and move with the moving location of one of the trackable devices. A notification is provided when the first trackable device or the second trackable device is out of the virtual dynamic perimeter. The sensitive item may be a bank cash cassette and the security providing entity may be a person responsible for the bank cash cassette.

20 Claims, 4 Drawing Sheets

(56) References Cited

U.S. PATENT DOCUMENTS

| | | | |
|---|---|---|---|
| 2014/0022050 A1* | 1/2014 | Dua | H04W 64/003 340/5.2 |
| 2014/0253314 A1* | 9/2014 | Rambadt | B60N 2/002 340/457.1 |
| 2015/0023502 A1* | 1/2015 | Li | H04W 4/021 380/270 |
| 2015/0097668 A1* | 4/2015 | Toth | A01K 15/023 340/539.13 |
| 2015/0269827 A1* | 9/2015 | Hopkins | H04W 4/22 340/539.12 |
| 2015/0281890 A1* | 10/2015 | Chen | H04W 4/008 455/456.1 |
| 2016/0016526 A1* | 1/2016 | Louboutin | H04W 4/021 701/2 |
| 2016/0088482 A1* | 3/2016 | Zeiler | H04W 4/028 455/426.1 |
| 2016/0133118 A1* | 5/2016 | Forchione | G08B 21/24 340/539.13 |

* cited by examiner

BRANCH DEVICE GEO-FENCING PAIRING SECURITY

BACKGROUND

In the banking industry, in the context of bank branches, a number of different items can greatly benefit from being geo-fenced for security reasons. A geo-fence may be viewed as indoor location security for items, people, and/or devices. The geo-fence is a virtual perimeter for the geographic position of these items and their relative position to a person, or to another device. Self Service Teller (SST) cash cassettes and teller tablets, for example, may be critical items that should stay close to bank staff members handling them. This also applies to other industries where sensitive items should be maintained within a perimeter for security reasons. The term "person" may include a person or may be viewed as any security providing entity. Other security providing entities may be devices, programmable or otherwise, that are used for safety or security of a sensitive item.

While some industries may use virtual perimeters for security purposes, these purposes are limited to breaking the perimeter for intrusion detection. This may be improved by the technology capabilities of current smart devices. These smart devices may be leveraged with minimal infrastructure cost to reduce the probability of theft and fraud in an indoor space such as a bank branch space, where a set of trackable items need to stay together within a specified distance of each other.

SUMMARY

In various embodiments, geo-fencing paired items, such as SST cash cassettes and other devices, for security purposes is described.

According to an embodiment, one mobile device is paired to another mobile device, a virtual perimeter between the paired devices is established, and a notification or alert is provided if one of the devices leaves or "breaks" the perimeter such that the devices exceed a predetermined distance from each other. More specifically, in one embodiment a location-aware device associated with an SST cash cassette may be paired to a location-aware device of a staff member handling the SST cash cassette during replenishment to ensure that both are kept at a close, or specified, distance for security purposes.

DETAILED DESCRIPTION

Figures 1, 1A:
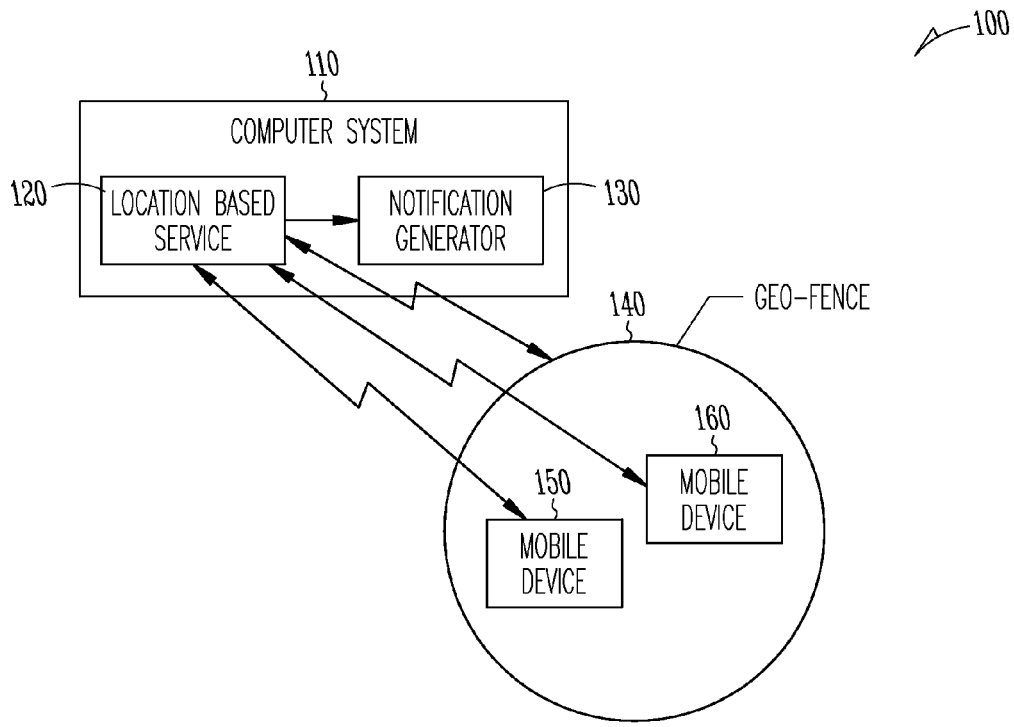
FIG. 1 is a diagram of architecture useful in establishing a virtual perimeter and pairing mobile devices to each other for tracking according to an example embodiment.
FIG. 1A illustrates a pairing register useful in or with a location based service associated with the architecture of FIG. 1, according to an embodiment.

FIG. 1 is a diagram of architecture 100 useful in establishing a virtual perimeter, or geo-fence, and pairing location-aware or "smart" mobile devices to each other for tracking within or relative to a geo-fence, according to an example embodiment. When used herein, "mobile device' means location-aware or "smart" devices such as a smart phone, smart watch, location-aware wearable technology, and the like. The architecture described provides a way to create a dynamic virtual perimeter for sensitive moving devices within the context of a bank branch, or other indoor locations or outdoor locations that require security, allowing control of which mobile devices are being tracked and when they are being tracked. A geo-fence or virtual perimeter may correspond to a shape on the surface of the Earth and may be statically generated or dynamically generated. A geo-fence may be viewed, in some embodiments, as a radius around or within an indoor office, indoor store or other point location, sometimes called a virtual perimeter. In other embodiments a geo-fence may be viewed as a predefined set of boundaries. Geographic location for mobile devices relative to the geo-fence may be detected by the use of the Global Positioning System (GPS) or other known technologies. Geo-fences may be used with or as part of a location-based service (LBS). An LBS is a general class of computer program-level services that use location data to control or monitor features such as the location of the mobile devices. As such, an LBS is an information service which has a number of uses and which may have access to mobile devices through the mobile network, and which uses information on the geographical position of the mobile devices. When the location-aware device monitored by a location-based service LBS enters or exits a geo-fence, a notification may be generated. This notification might contain information about the location of the device. In some embodiments the notification might be sent to a mobile telephone or an email account. In some embodiments the notification may be an alarm that is a notification that the boundary is broken. In some embodiments the notification may be an alarm sent to a manager or the operator of a system. Stated another way, Geo-fencing may allow principals or owners of the LBS to draw zones around places of work, customer's sites and secure areas, which may be indoor locations. These geo-fences when crossed by a location-aware device can trigger a warning to a user, a manager, or to an operator of a secure system via SMS, Email, a visual alarm, a tactile alarm, or, if desired, by sounding an audible alarm. Technologically, geo-fencing, in a security strategy model, may provide security to wireless local area networks. This may be done by using predefined borders, e.g., an office space with borders or perimeters established by positioning technology associated with, or attached to, a specially programmed server. The office space may become an authorized indoor location for designated users and wireless mobile devices. In some embodiments only specific parts of the office space may comprise the predefined border. The predefined border may be used as an authorized area for paired trackable devices such as wireless mobile devices. If the border is broken a computer interrupt may cause a notification such as discussed above.

In some embodiments, an LBS in or associated with a bank branch may allow branch staff members to set up a list of trackable devices that can be paired to each other, along with their allowed paths and allowed distances from each other with respect to a geo-fence defined within the bank branch area where the devices are allowed to be together, and actions may be triggered when the defined geo-fence is reached or surpassed. The LBS may use existing indoor location solutions to track these devices. This architecture may be scaled to a globally accessible service (e.g., installed at one or more financial institution branches or other central locations) so that the LBS may track mobile devices relative to geo-fences that are determined by the financial institution, either inside or outside branches.

Referring again to FIG. 1 computer system 110 is seen, which may in some embodiments be a bank server. In some embodiments the server may be a cloud server. In some embodiments computer system 110 may be, or may be associated with, an automated teller machine (ATM), also known as a self-service teller (SST)). SST and ATM will be used herein synonymously. An ATM or SST is an electronic telecommunications device that may include a cash dispenser, such as an SST cash cassette, and enables customers of financial institutions to perform financial transactions without the need for a human cashier, clerk or bank teller. Using an SST, customers can access their bank deposit or credit accounts in order to make a variety of transactions such as, for example, cash withdrawals or deposits, check balances, or engage in credit transactions. Internally, an ATM may include a journal printer for creating a record of every transaction executed by the ATM, a network connection module for accessing a remote authorization system, and a controller module (in the form of a PC core) for controlling the operation of the ATM, including the operation of the various modules thereof. The controller may comprise a BIOS stored in nonvolatile memory, a microprocessor, an associated main memory, storage space in the form of a magnetic disk drive, and a display controller in the form of a graphics card. The display module may be connected to the controller module via the graphics card installed in the controller module. Other ATM modules may be a biometric module for identification, card reader module for reading cards, receipt printer module for printing receipts, a functional display key module for display purposes, a dispenser module for dispensing cash, a deposit module for receiving deposits, and an encrypting keypad module for encryption purposes. These modules may be connected to the ATM controller for control purposes. In use, the main memory is loaded with an ATM operating system kernel, an ATM application and a biometric capture object. As is well known in the art, the operating system kernel is responsible for memory, process, task, and disk management. The ATM application is responsible for controlling the operation of the ATM. In normal operation the ATM application provides the sequence of screens used in each transaction (which may be referred to as the transaction flow); monitors the condition of each module within the ATM (for example, state of health monitoring); and obtains authorization for transactions from a remote transaction authorization server, all operating to implement the functions as selected by the customer.

In some instances the cash cassette requires refilling or other service and a bank branch staff member is responsible for such refilling or other service. In these cases security is required, part of which may include ensuring that the cash cassette is maintained within a maximum allowable distance from the branch staff member, as discussed in more detail below. In some embodiments the computer system may be, or be used as, or with, a point of sale (POS) device or kiosk.

Computer system 110 comprises location based service (LBS) 120, discussed above, and a notification generator 130. The LBS 120 may be a well-known type of service that generates geo-fence 140 and keeps track of mobile devices such as 150 and 160 using GPS or other location determining technology. The LBS is operational over a network which may be wired, wireless, or a combination of wired and wireless. In some embodiments mobile devices may employ an existing indoor location solution for tracking these devices, such as indoor GPS or a Bluetooth Low Energy wireless personal area network technology such as BLE 4.0 beacons. In some embodiments, a sensitive item such as an SST cash cassette includes, or has affixed thereto, or associated therewith, a trackable device that reports its position to the LBS 120. Another mobile device may be a trackable device such as a smart watch, smart phone, location-aware wearable technology, or similar device worn by a bank staff member. The trackable devices may be paired, using well known pairing technology, and report their positions to the LBS to enable the LBS to keep track of the mobile devices with respect to the geo-fence 140. The geo-fence may establish the maximum separation between the devices. In this way the SST cash cassette may be paired to the smart watch of the staff member handling it during replenishment, ensuring both keep at close distance.

FIG. 1A illustrates a pairing register useful in or with an LBS associated with the architecture of FIG. 1, according to an embodiment. In FIG. 1A, LBS 120 may also comprise or have associated therewith pairing register 170 for the purpose of pairing mobile devices relative to the geo-fence 140 of FIG. 1. Pairing register 170 stores the devices to be paired, as well as their geo-fence perimeters, their paths, and their allowed minimum distances. In one embodiment storage 175 stores device 1, which may be a mobile device associated with an SST cash cassette, and device A which may be a mobile device associated with a branch staff member responsible for the SST cash cassette. Each device may be paired to the other by the LBS. Also stored is the geo-fence perimeter for the paired devices, their paths, if desired, and the maximum allowable distance between them. Although any number of devices may be paired, in accordance with the designer's choice, FIG. 1A illustrates three pairs of mobile devices, two pairs in addition to device 1-device A being device 10-device J, and device 26-device Z, shown at storage 180 and 185, respectively. LBS 120 of FIG. 1 may include programming modules in or associated with the computer system 110 as more fully discussed below.

Figure 2:
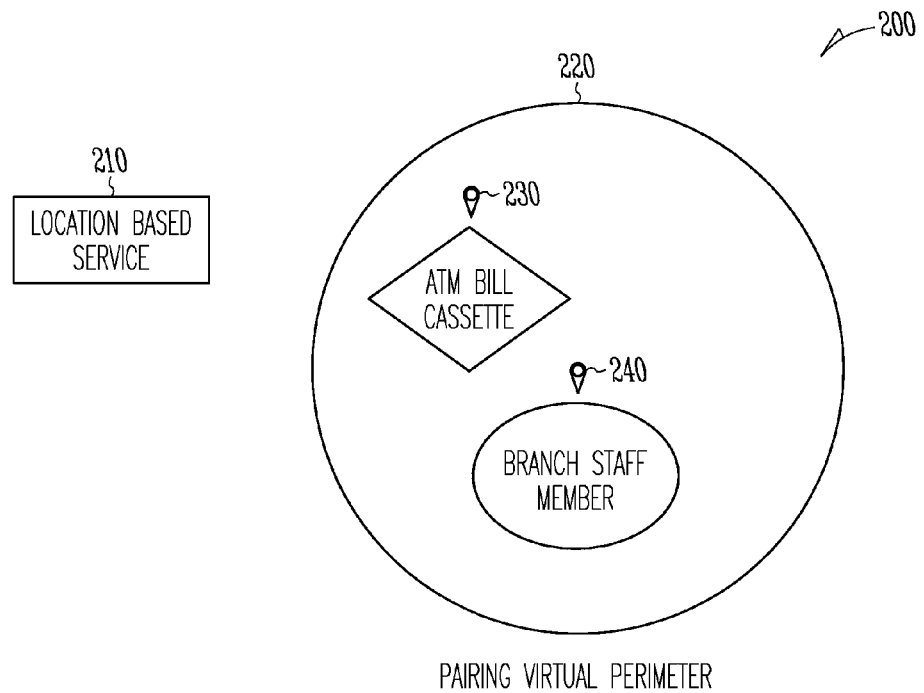
FIG. 2 is a diagram of establishing a dynamic virtual perimeter for mobile devices and allowing tracking of the devices, according to an example embodiment.

FIG. 2 is a diagram of establishing a dynamic virtual perimeter for mobile devices and allowing tracking of the devices, according to an example embodiment. In the current context the term "sensitive" may be used to indicate that security is needed for an item, such as an SST cash cassette, as discussed above. LBS 210 pairs and monitors trackable devices 230 and 240 using the information in the pairing register 170 of FIG. 1A as discussed above. Trackable device 230 may be associated with an SST cash cassette. Trackable device 240 such as, in one example, a smart watch of, may be associated with a branch staff member who is responsible for the SST cash cassette. The virtual perimeter 220 is established by the LBS to indicate or define the maximum distance that the trackable devices 230 and 240 may be positioned from each other. As illustrated in FIG. 2, the paired trackable devices 230 and 240 are tracked as being within range of their allowed geo-fence perimeter, and no notification is generated by notification generator 130 of FIG. 1.

Figure 3:
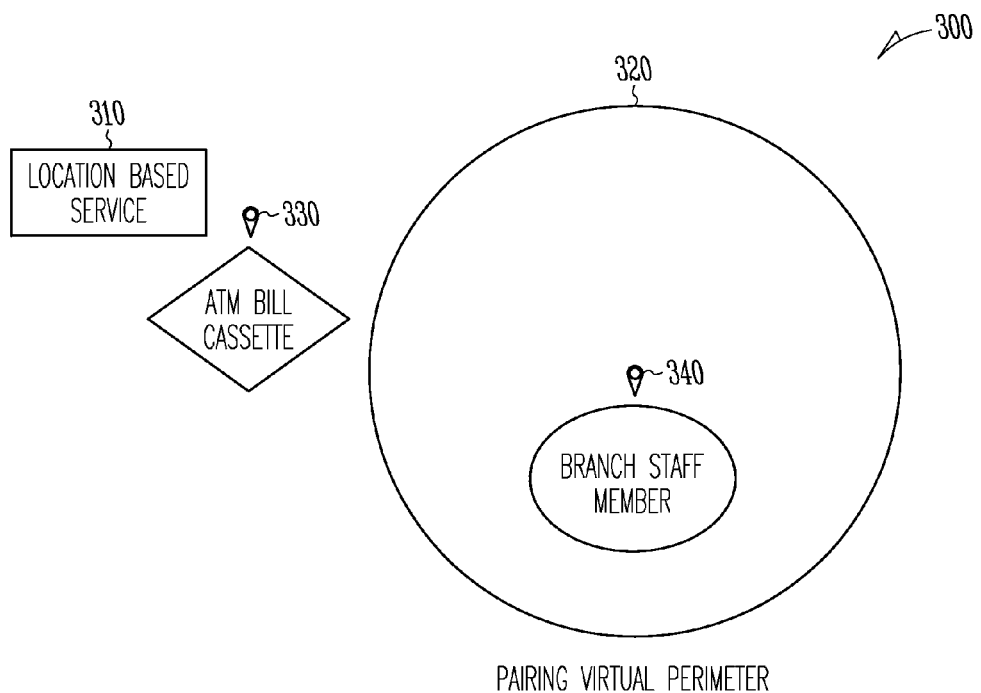
FIG. 3 is another diagram for establishing a dynamic virtual perimeter for mobile devices and allowing tracking of the devices, according to an example embodiment.

FIG. 3 is another diagram for establishing a dynamic virtual perimeter for mobile devices and allowing tracking of the devices, according to an example embodiment. LBS 310 detects that trackable device 330 associated with the SST cash cassette is outside the established geo-fence. This may because the trackable device associated with branch staff member 340 has moved with respect to the SST cash cassette 330 such that in this instance the cassette is now outside of the established perimeter. Stated another way, the branch staff member may have walked away too far and the SST cash cassette becomes out of the allowed geo-fence. In this situation, the LBS 120 of computer system 110 of FIG. 1 performs the established action for the cassette being beyond its allowed distance from the bank branch staff member. This may be sending an email to the responsible manager or operator, sending an alarm, which may be a red light, to the manager or operator or, in some instances, sounding an audible alarm.

Figure 4:
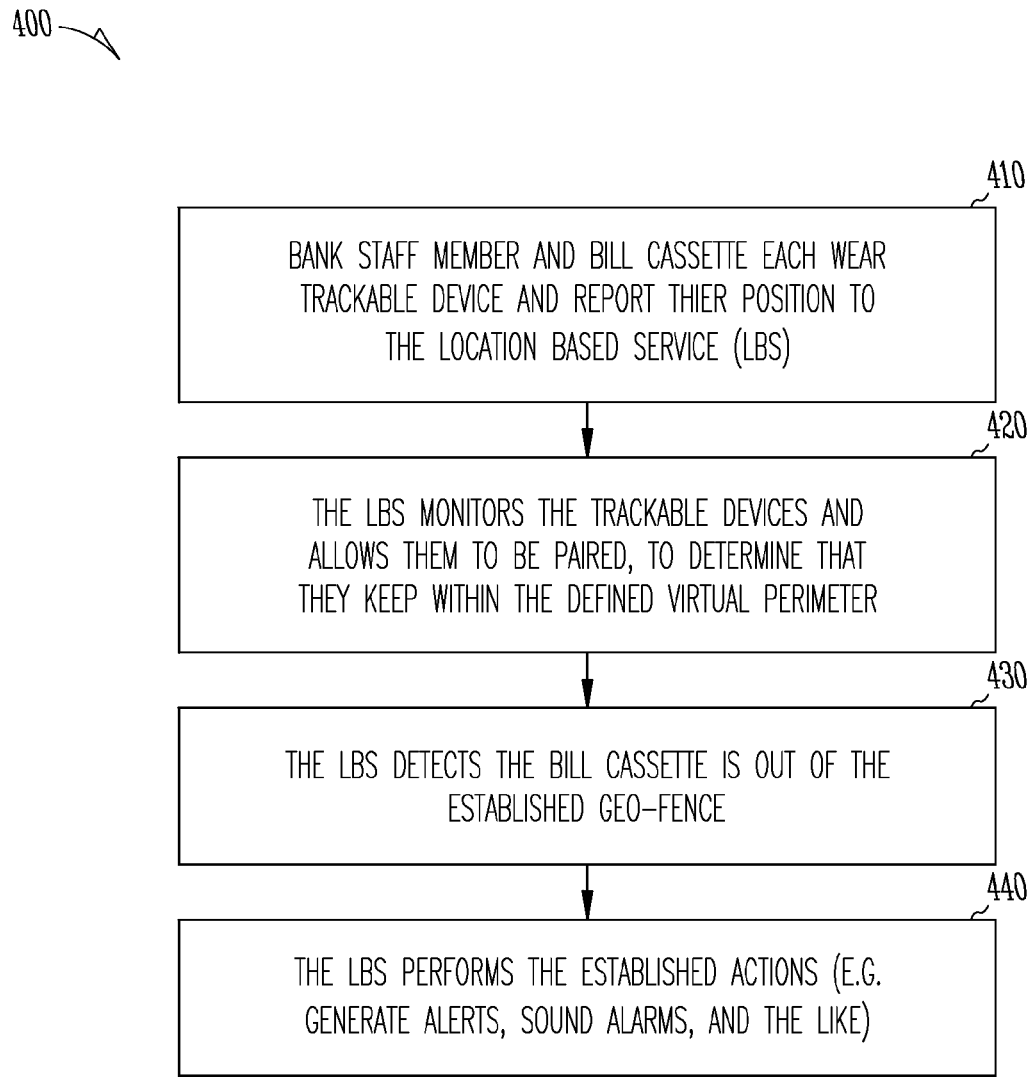
FIG. 4 is a diagram of a method for monitoring paired, trackable mobile devices with respect to a virtual perimeter and providing an alarm when the virtual perimeter is broken, according to an embodiment.

FIG. 4 is a diagram of a method 400 for a dynamic virtual perimeter for paired tracked mobile devices and sounding an alarm when the virtual perimeter is broken, according to an embodiment. At 410 the dynamic virtual perimeter has been established as discussed above. The responsible bank branch staff member 240 of FIG. 2 and the SST cash cassette 230 of FIG. 2 each wear, or in the case of the SST cash cassette, is associated with, a trackable device such as a location-aware device, and report their position to the LBS. At 420 the LBS pairs the trackable devices 230 and 240 and monitors them to determine whether they stay within the defined virtual perimeter 220. At 430 the SST cash cassette represented by 330 of FIG. 3 is out of the established geo-fence 320. As discussed above, this may be because the branch staff member represented by 340 has walked too far away from device 330 such that the device 330 is now beyond the maximum allowable distance between devices 330 and 340 of FIG. 3. At 440 of FIG. 4 the LBS performs the established action sending an alert email or SMS text to a manager or operator, placing a telephone call to the manager or operator, generating a visual alert or tactile alert to the manager or to the operator, or sounding an audible alarm, among others.

Figure 5:
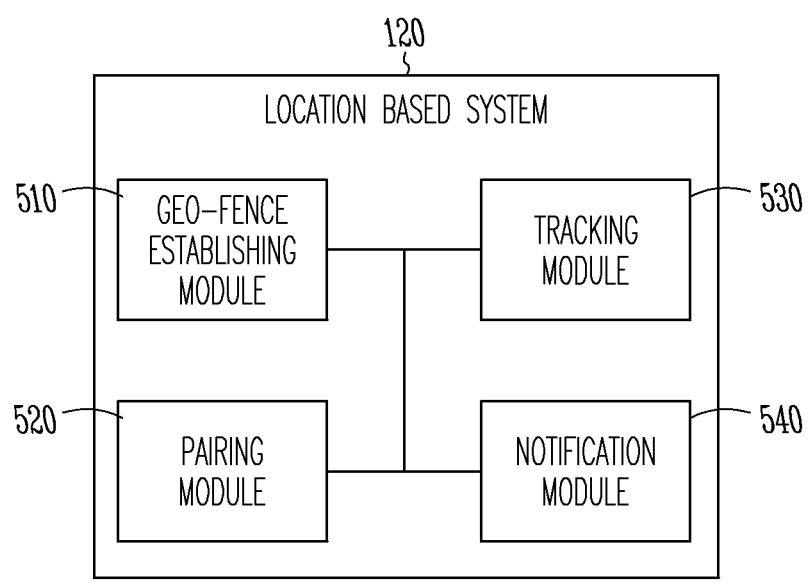
FIG. 5 is a block diagram illustrating components of a location based system according to an example embodiment.

FIG. 5 is a block diagram illustrating components of a location based system according to an example embodiment. The LBS, illustrated as 120 of FIG. 1, comprises among other modules, a geo-fence establishing module 510, a pairing module 520, a tracking module 530, and a notification module 540, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. In operation, geo-fence establishing module 510 may use, for establishing a geo-fence, data input that identifies or indicates the virtual perimeter 140 of FIG. 1. The data may be, for example, coordinates of the geo-fence, or a virtual perimeter surrounding a given point. In some embodiments the perimeter may be a dynamic perimeter, the given point may be the moving location of one of the paired devices, and the dynamic perimeter moves with the moving location of the moving paired device. In some embodiments the given point may be the stationary position of one of the paired devices. In some embodiments the geo-fence establishing module 510 may be responsible for creating dynamic geo-fences (e.g., dynamic virtual perimeters) in collaboration with the pairing module 520 based on the moving position of one of the paired devices. In some embodiments the virtual perimeter encompasses and moves with the moving location of one of the paired devices. In some embodiments, if one of the moving paired device moves such that the other paired device is outside the virtual perimeter, a notification may be sent as discussed below. In some embodiments the data that indicates or defines the virtual perimeter may be provided by an operator of the location security system discussed above. The pairing module 520 may cooperate with pairing register 170 of FIG. 1A to pair together desired pairs of devices such as device 1 and device A of storage 175 of FIG. 1A, using well known pairing techniques. Tracking module 530 may include a wireless interface and may track mobile devices, such as 150 and 160 of FIG. 1 using well known tracking techniques. Alternately tracking module 530 may receive input signals from a GPS system, the input signals corresponding to the position of the paired devices at any given time. Notification module 540 may detect when, or receive a signal from tracking module 530 that indicates when, one of a set of paired devices is outside of the virtual perimeter as discussed above. Notification module 540 may then provide a signal for sending a notification, or may itself send the notification as discussed in more detail above.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

What is claimed is:

1. A computer implemented method comprising:
  establishing via a computer system a dynamic virtual perimeter for two trackable devices by a location based service associated with the computer system;
  pairing the two trackable devices by the location based service;
  tracking the movement of the paired two trackable devices by the location based service; and
  generating, by the location based service, a notification when one of the two trackable devices is outside the virtual perimeter.

2. The computer implemented method of claim 1 wherein the dynamic virtual perimeter surrounds and moves with the location of a moving first of the two trackable devices and the notification is generated when the second of the two trackable devices is outside the dynamic virtual perimeter.

3. The computer implemented method of claim 2 wherein the dynamic virtual perimeter defines the allowable distance of separation between the two trackable devices.

4. The computer implemented method of claim 2 of wherein the second of the two trackable devices is affixed to or associated with a sensitive item for which security is provided, and the first of the two trackable devices is affixed to or associated with a security providing entity.

5. The computer implemented method of claim 2 wherein the sensitive item is a self-service terminal (SST) currency cassette.

6. The computer implemented method of claim 1 wherein the computer system comprises a location based system for establishing the dynamic virtual perimeter, for pairing and tracking the two trackable devices, and for causing the sending of the notification.

7. The computer implemented method of claim 2 wherein the dynamic virtual perimeter is an indoor location.

8. The computer implemented method of claim 1 wherein the notification comprises one of an email, an SMS text, a visible alarm, a tactile alarm or an audible alarm.

9. A computer implemented method comprising:
establishing, via a location based service associated with a computer system, a virtual perimeter for a first trackable device associated with a sensitive item for which security is provided and a second trackable device associated with a security providing entity;
pairing the first trackable device and the second trackable device by the location based service;
tracking the first trackable device and the second trackable device by the location based service; and
generating, by the location based service, a notification when the first trackable device or the second trackable device is out of the virtual perimeter.

10. The computer implemented method of claim 9 wherein the second trackable device is moving, the virtual perimeter surrounds and moves with the moving location of the second trackable device, and the notification is generated when the first trackable device is outside the virtual perimeter.

11. The computer implemented method of claim 10 wherein the sensitive item is a self-service terminal (SST) cash cassette and the security providing entity is a person responsible for the security of the SST cash cassette.

12. The computer implemented method of claim 10 wherein the virtual perimeter establishes the maximum distance of separation between the first trackable device and the second trackable device.

13. The computer implemented method of claim 10 wherein the virtual perimeter is an indoor location.

14. The computer implemented method of claim 10 wherein the first trackable device is affixed to a sensitive item for which security is provided and the second trackable device is affixed to a security providing entity.

15. A self-service terminal (SST) comprising:
a display; and
one or more computer processors configured to include
a transaction application for providing a sequence of display screens used in each transaction; and
a location based system including
a geo-fence establishing module for establishing a dynamic virtual perimeter for a first trackable device associated with a sensitive item for which security is provided, and a second trackable device associated with a security providing entity;
a pairing module for pairing the first trackable device and the second trackable device;
a tracking module for tracking the first trackable device and the second trackable device; and
a notification module for providing a notification when the first trackable device or the second trackable device is out of the virtual perimeter.

16. The method of claim 15 wherein the first trackable device is moving, the virtual perimeter encompasses and moves with the moving location of the moving first trackable device, and the notification is generated when the second trackable device is outside the virtual perimeter.

17. The SST of claim 16 wherein the first trackable device is associated with a sensitive item that requires security and the second trackable device is associated with a person who is responsible for the security of the sensitive device.

18. The SST of claim 16 wherein the sensitive item is an SST cash cassette.

19. The SST of claim 16 wherein the virtual perimeter defines the allowable distance of separation between the sensitive item and the security providing entity.

20. The SST of claim 16 wherein the virtual perimeter comprises an indoor location.

* * * * *